United States Patent [19]

Lewis

[11] 4,034,832

[45] July 12, 1977

[54] PANTOGRAPH EMERGENCY LOWERING SYSTEM

[75] Inventor: Carl B. Lewis, Erie, Pa.

[73] Assignee: General Electric Company, Erie, Pa.

[21] Appl. No.: 711,750

[22] Filed: Aug. 4, 1976

[51] Int. Cl.² .......................................... B60L 5/14
[52] U.S. Cl. .................................. 191/86; 191/85; 191/90
[58] Field of Search .................. 191/66, 68, 69, 70, 191/85, 86, 88, 89, 90, 8

[56] References Cited

U.S. PATENT DOCUMENTS

| | | | |
|---|---|---|---|
| 946,753 | 1/1910 | Case | 191/8 |
| 3,444,338 | 5/1969 | Leger | 191/85 |

FOREIGN PATENT DOCUMENTS

| | | | |
|---|---|---|---|
| 968,340 | 9/1964 | United Kingdom | 191/66 |

OTHER PUBLICATIONS

Institute of Mechanical Engineers, pp. 27–29, Mar. 8, 1971, "Development of the Pantograph", D. J. W. Souch and G. Taylor.

*Primary Examiner*—Trygve M. Blix
*Assistant Examiner*—Reinhard J. Eisenzopf
*Attorney, Agent, or Firm*—James H. Beusse

[57] ABSTRACT

An emergency lowering system for a vehicle mounted pantograph in which lever actuated trip valves are disposed at opposite ends of the pantograph current collector in a position to be actuated in the event that an overhead contact wire tends to slide off and end of the current collector. The trip valves control a relay air valve which is arranged to supply a relatively large volume of high pressure air to a pneumatic jack wherein the jack is connected to lower the pantograph. In a preferred embodiment the emergency lowering system is adapted to supply air at a higher pressure and larger volume than the normal lowering system whereby the pantograph is lowered at a faster rate in an emergency. For use in a train of vehicles the system includes a pressure responsive switch for detecting initiation of an emergency lowering condition and for providing a signal which can be used to effect lowering of all pantographs in the train if any one pantograph experiences an emergency condition.

8 Claims, 5 Drawing Figures

PANTOGRAPH EMERGENCY LOWERING SYSTEM

BACKGROUND OF THE INVENTION

The present invention relates to pantograph safety and protection systems and, more particularly, to an emergency lowering system for a pantograph.

Electric powered vehicles such as transit cars, trolleys and locomotives typically are powered from a wayside power source which may comprise an elevated catenary system. Catenary systems are well known and generally include a catenary or messenger cable strung between vertical supports, an electrical line or contact wire for carrying electrical power and a plurality of spaced dropper lines supporting the contact wire from the catenary cable. The dropper lines are connected to the contact wire by metal clips. With this arrangement the contact wire is supported in a substantially uniform horizontal plane by varying the lengths of the dropper lines. At curves the contact wire is pulled into an arc by the use of dropper lines or pull off lines which pull the contact wire in a horizontal direction.

The vehicles employ roof mounted pantographs which extend vertically to engage the current carrying contact wire and supply power to the vehicle. The pantographs typically include an articulated support and a current collector, the latter being referred to as a pan, bow or shoe. The current collector or pan has an elongated flat upper contact surface designed to be maintained in sliding contact with the elevated overhead contact wire. The pan also includes depending arcuate members or horns extending from the opposite ends of the contact surface. The horns minimize the abrupt transition from the contact surface if a contact wire slides laterally off the surface and tends to encourage the contact wire to slide up and onto the contact surface if some counteracting lateral force is present.

The articulated support for the pan is a spring supported arrangement which urges the pan upward with a substantially uniform force, e.g., 26 to 28 pounds. During operation of the vehicle, this spring force is sufficient to maintain the pan in sliding contact with the contact wire without being sufficiently strong to appreciably lift the contact wire itself. The pantograph is lowered by counter-biasing means which may comprise, for example, a pneumatic jack operated by a controllable source of a pressurized gas such as air.

It will be appreciated that if the contact wire does not exert a downward force on the pantograph, the spring biasing system will urge the pantograph into its fully extended position. If, for example, the contact wire is broken, the pantograph will lose contact with the wire and will be urged into a fully extended position. Similarly, if dropper lines become broken, the slack created in the contact wire may allow it to slide laterally off the current collector. In either of these events the fully extended pantograph on a moving vehicle may become tangled in the dropper lines and result in destruction of portions of the catenary system and the pantograph itself. In a train of vehicles having a plurality of pantographs, each pantograph entering the discontinuous section may become fully extended and similarly entangled, it being noted that in a typical train arrangement, so long as one pantograph remains in operative contact with a contact wire, the train will continue to receive power and be propelled.

The problems resulting from loss of contact between the current collector and contact wire have been recognized by the prior art. In U.S. Pat. No. 3,444,338 a protection system is proposed which would sense abnormal stress on the pantograph such as would occur upon impact of the fully extended pantograph with the overhead catenary system. In an alternative embodiment, limit switches on the articulated support are set to detect full extension of the pantograph. In both these systems, detection of the indicated condition will activate a lowering system to retract the pantograph to a rest position. Protective systems of this and other types are used by British Railways and are described in a paper by D. J. W. Souch and G. Taylor entitled Development of the Pantograph For High Speed Collection and published by the Institution of Mechanical Engineers on Mar. 8, 1971. A further system described in the referenced paper includes a piping system which pipes the gas for the pneumatic lowering jack to the underside of the pan through a control valve. In the event of the pan being dislodged the piping will be ruptured and vent to atmosphere whereby the control valve will be operated and force lowering of the pantograph. Each of the above-described systems require that the pantograph become fully extended before corrective action is taken and at least some of the systems require that impact and possible damage occur before the pantograph is lowered.

In studying the problems which result in damage to a pantograph, it has been found that a majority of the problems are caused by an out of position contact wire as a result of dropper line pull off line, or clip failures rather than breakage of the contact wire. Consequently, most problems begin when a contact wire slides off an end of a current collector rather than a current collector running off the end of a contact wire at a break point.

SUMMARY OF THE INVENTION

It is an object of the present invention to provide an improved protective system for a pantograph.

It is a further object of the present invention to provide a protective system for a pantograph which can operate before the pantograph is fully extended.

It is a still further object of the present invention to provide a protection system for a pantograph which responds to a contact wire sliding off an end of a pantograph current collector.

In accordance with the present invention there is provided a protection system for a pantograph which system includes a pair of pneumatic trip valves mounted on opposed ends of an elongated current collector. The trip valves each have a lever arm extending upward of the upper surface of the current collector whereby engagement of the lever arm with a contact wire will actuate the trip valve. The trip valves are connected to an air supply system which is used to effect retraction of the pantograph. Actuation of a trip valve vents air to atmosphere and causes a pressure reduction on a relay air valve. The reduced pressure on the relay air valve allows this valve to provide an air passage between a source of air under pressure and a pneumatic jack connected to the pantograph in a manner to effect retraction of the pantograph to a rest position.

In a preferred embodiment the relay air valve is connected to supply a larger volume of air at a higher pressure than is normally supplied to lower the pantograph. This arrangement causes the pantograph to be forced down at a faster rate under emergency conditions. In another embodiment for use in a train of electric vehicles wherein a plurality of vehicles each have a pantograph, a pressure switch connected to the relay air valve responds to actuation of this valve to close an electrical circuit and send a signal to the other vehicles whereby all pantographs may be lowered when any one pantograph experiences an emergency retraction.

BRIEF DESCRIPTION OF THE DRAWINGS

These and other objects and features and advantages of the present invention will become more readily apparent upon reference to the appended description when taken in conjunction with the following drawings in which.

DESCRIPTION OF THE PREFERRED EMBODIMENT

Figure 1:
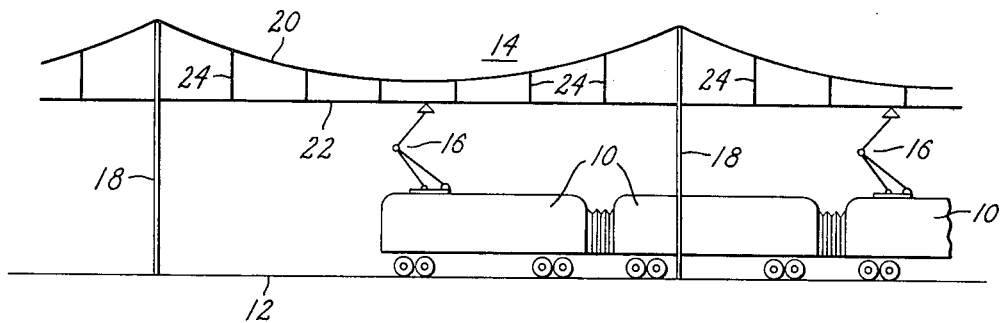
FIG. 1 is a simplified drawing of an electric train powered from an overhead catenary system.

Referring now to FIG. 1, a train of electric traction vehicles 10 are illustrated as operated on a railway track 12 while receiving power from a wayside source (not shown) via a catenary system 14, a pantograph 16 and the grounded rails of the track 12. The catenary system comprises a plurality of spaced support posts 18 to which a catenary or messenger wire 20 is physically attached by suitable insulators (not shown). Messenger cable 20 provides support for an electric line or contact wire 22 which, through contact with pantographs 16, provides power to the vehicles 10. The contact wire 22 is suspended from the messenger cable 20 by means of a plurality of spaced drpper lines or droppers 24. In order to maintain the contact wire 22 at a substantially level horizontal position, the lengths of the droppers 24 are varied over the distance between the support posts 18.

Figure 2:
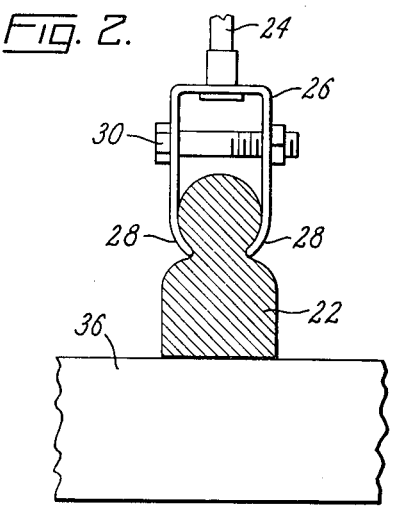
FIG. 2 is a cross sectional view of a catenary contact wire and support arrangement.

Droppers 24 are attached to the contact wire 22 in a manner well known in the art. Referring to FIG. 2 there is illustrated one method of connecting droppers 24 to contact wire 22 in which the dropper 24 is attached to a spring metal clip 26, the clip 26 being terminated in fingers 28 which fit into grooves formed along the side of the bare contact wire 22. In the illustrated embodiment a bolt 30 passing through the clip 26 provides force to maintain the fingers 28 in engagement within the groove of the contact wire 22. It is noted that the bottom face of the contact wire 22 is a broad flat surface which provides a relatively large contact area for mating with the upper contact surface of a current collector 36 of the pantograph 16.

Figure 3:
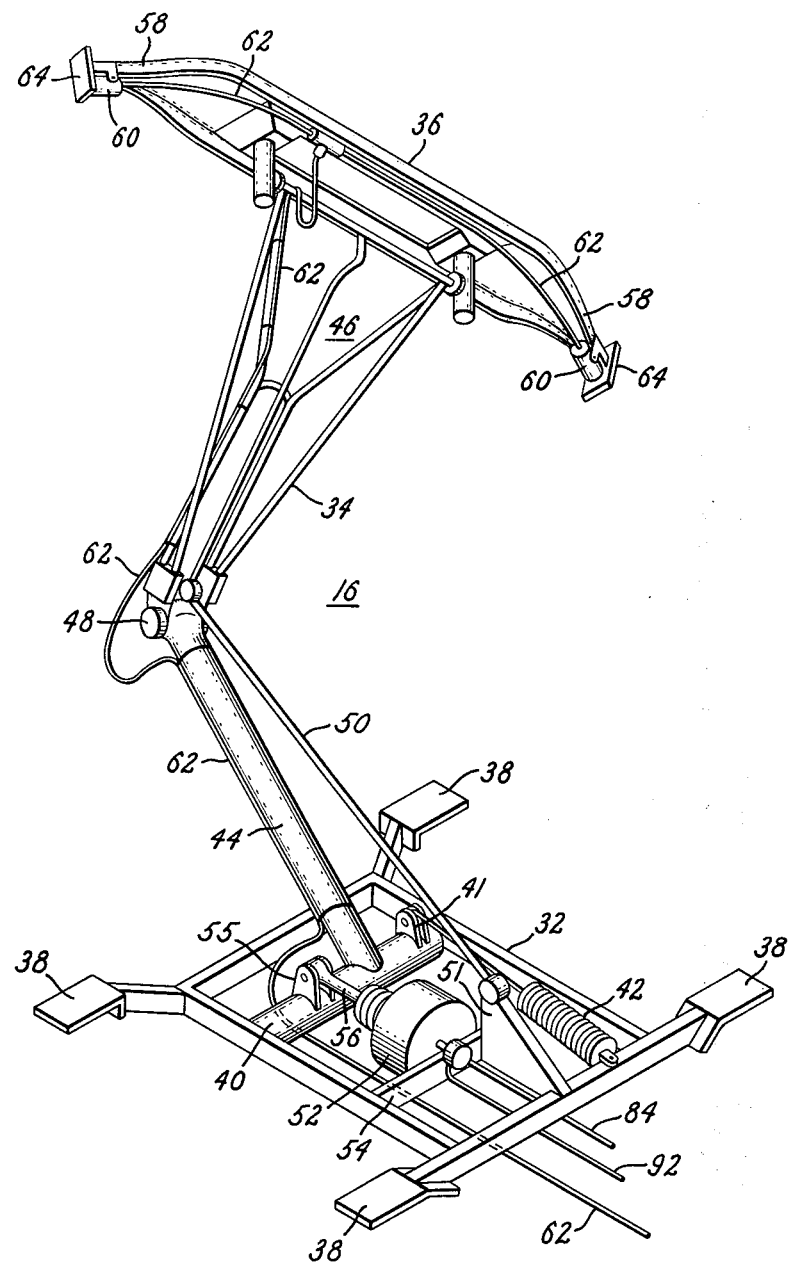
FIG. 3 is a perspective view of a pantograph incorporating the present invention.

Referring now to FIG. 3, the pantograph 16 is of a type well known in the art and can be seen to comprise a support frame 32, an articulated support 34 and a current collector 36. The support frame 32 includes a plurality of feet 38 which are normally attached through insulated spacers (not shown) to the top of the vehicles 10. The articulated support 34 pivots about a central axis 40 which is attached to the side members of frame 32. Biasing means in the form of a spring member 42 connected between one end of the support frame 32 and a raised arm 41 on axis 40 exerts a clockwise rotational force on the axis 40 to cause the articulated support 34 to move in an upward direction. The support 34 comprises a lower arm member 44 which pivots about the central axis 40 and an upper section comprising a plurality of support members 46 which are attached to the current collector 36. The upper support members 46 are pivotally attached to the lower member 44 at the point 48. The upper support members 46 are also attached through a connecting rod 50 to a support 51 at the rear of the support frame 32. Rotation of member 44 is a clockwise direction causes a force to be exerted on the upper support members 46 by means of connecting rod 50 which tends to cause the support members 46 to rotate about the point 48 in a counterclockwise direction.

The pantograph 16 may be retracted to a rest position by exerting a force to cause the central axis 40 to rotate in a counterclockwise direction. This retracting force is exerted by a counter-biasing means indicated as a pneumatic jack 52 connected between a cross support member 54 and a raised arm 55 on a access member 40. By supplying compressed air under pressure to the pneumatic jack 52 a piston arm 56 may be forced outward to exert a counter-biasing pressure to cause counterclockwise rotation of axis 40 and subsequent lowering of the pantograph 16.

The current collector 36 has a substantially flat, elongated upper contact surface for effecting sliding contact with the bottom surface of the contact wire 22. The collector 36 also includes depending arcuate members or horns 58 on each end of the upper contact surface. The horns 58 minimize the abrupt transition from the upper contact surface and provide some incentive for a contact wire coming in contact with the horns to tend to ride up into the contact surface proper. When mounted on a traction vehicle, the elongated upper contact surface of current collector 36 is generally disposed transversely to the direction of movement of the vehicle.

The present invention contemplates the addition of automatically actuated trip valves 60 to be mounted at opposed ends of the upper contact surface of current collector 36, preferably at the ends of the horns 58. Because of the relatively high voltages associated with the catenary system and the amount of electrical noise in the system due to bouncing of the pantograph contact surface against the contact wire 22, the trip valves 60 are preferably pneumatic valves and are supplied with air under pressure through an air tube 62. The air tube 62 should be formed of a semi-flexible material since it must flex at the points at which the articulated arm 34 rotates. In addition the tube 62 should be ultraviolet light stabilized to minimize deterioration by sunlight and electrical arcs which exist at the contact surface of the pantograph 16. A suitable tubing for this use has been found to be a nylon pressure tubing type LP available from the Polymer Corp., Polypenco Division, Reading, Pa. The trip valves 60, to be described more fully hereinafter, include upper arms 64 which extend above the surface of the horns 58 whereby any object such as the contact wire which tends to slip down over the horn and would normally slip off the pantograph will engage the lever arms 64 and cause actuation of the trip valves 60. Actuation of the trip valves 60 is effective to cause an emergency lowering or retracting of the pantograph 16 to a rest position.

Figure 4:
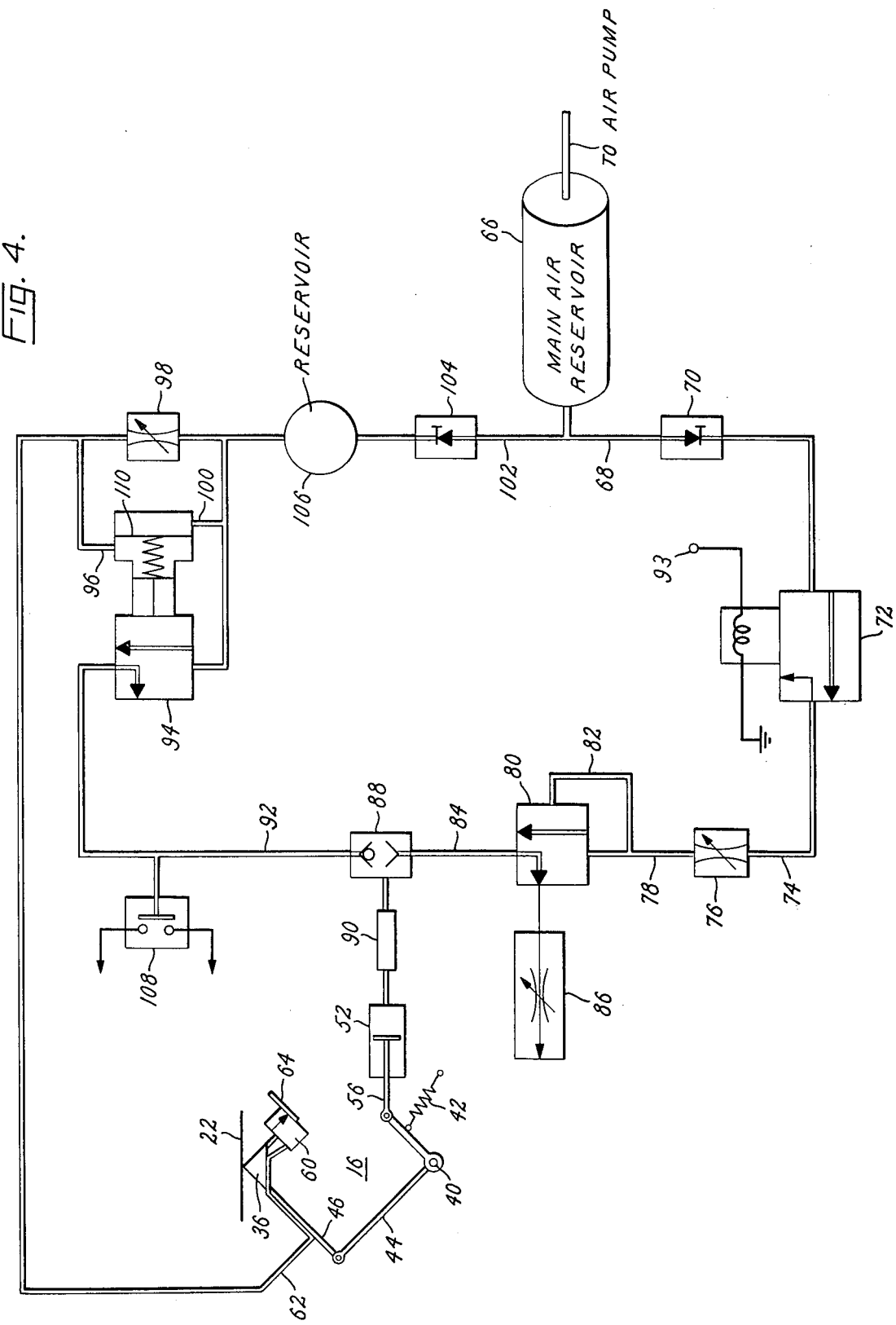
FIG. 4 is a simplified schematic diagram of a control system for a pantograph including the control system for the present invention.

For a better understanding of the present invention, reference is made to FIG. 4 in which there is illustrated a schematic diagram of actuation and control apparatus for the pantographs 16. In the retracted or rest position an air controlled latch assembly (not shown) normally retains the pantograph 16 in the down position. When released the pantograph 16 is urged upward with a substantially uniform pressure by spring member 42 which tends to force or urge the pantograph 16 toward an upward or fully extended position until a downward force is exerted by the contact wire 22. For normal operation a main air reservoir 66 supplied with air under pressure from a pump (not shown) supplies pressurized air to control the pneumatic jack 52. The main reservoir supplies pressurized air throoùgh an air line 68 and a regulating valve 70 to an electro-magnetic valve 72. Regulating valve 70 is of a type well known in the art and serves to reduce the high pressure from the main air reservoir to a nominal working pressure for the pneumatic jack 52 such as, for example, 90 psi. The electromagnetic valve 72 is an electrically operated valve of the type well known in the art and functions when actuated to connect the air incoming through regulalting valve 70 to the output line 74. In the non-actuated position the electro-magnetic valve 72 interrupts the air supply to prevent air from flowing to the pneumatic jack 52. Air supplied from electro-magnetic valve 72 through air line 74 passes through a flow control valve 76 which limits the in-rush of air and holds the air to a controlled rate of flow to assure that the pneumatic jack 52 operates at a controlled rate so that the pantograph 16 is returned to its rest position at a rate designed not to inflict damage upon the pantograph. From rate control valve 76 the air supply passes through an air line 78 to an air operated valve 80. Valve 80 is also of a type well known in the art and is actuated by the air supply which flows through a line 82 to force the valve to move into a conflicting position whereby air in line 78 is allowed to pass through the valve. When non-actuated the valve 80 connects the output air line 84 to a second output port of the valve. This second output port is connected to a second flow rate control valve 86 which valve is similar to rate control valve 76. Valve 86 vents air to atmosphere and as will be appreciated by those skilled in the art allows the air accumulated in pneumatic jack 52 to bleed back through the valve 80 and rate control valve 86 at a controlled rate to prevent the spring 42 from biasing the pantograph upward at too rapid a rate. In this operation the combination of jack 52 and valve 86 serves as a dash-pot to dampen the movement of pantograph 16. The air line 84 is connected to pneumatic jack 52 by means of a double check valve 88 and an insulator 90. The double check valve 88 is of the type well known in the art and allows air to flow into jack 52 from either line 84 or from a second input line 92 as a function of whichever line has the highest air pressure. The insulator 90 is utilized to isolate the air lines in the supply system, which are normally of metal tubing, from the pantograph system proper which is operated at a relatively high voltage.

In normal operation the air from the main reservoir is regulated by valve 70 to a nominal level and, upon actuation of electromagnetic valve 72 by a control signal applied to input terminal 93, the pressure regulated air flows through valve 72, flow rate control valve 76, valve 80, and check valve 88 into the pneumatic jack 52. This air pressure is sufficient to force the piston of jack 52 towards the left and cause counterclockwise rotation of the axis 40 whereby the pantograph 16 is retracted to a rest position.

The pantograph emergency lowering system utilizes the pneumatic jack 52 to effect retraction of the pantograph 16 but lowers the pantograph at a much faster rate by applying a greater volume of air at a greater pressure to the jack 52. This air supply system includes the double check valve 88 and the air line 92. The air flow into air line 92 is controlled by a pneumatic relay air valve 94. Relay air valve 94 is of a type well known in the art such as, for example, the type HB-5 relay air valve manufactured by Westinghouse Air Brake Company. Actuation of the air valve 94 is controlled by the trip valves 60 which are connected such that in their tripped position the air in line 62 is vented to atmosphere. Line 62 is connected to a first control port 96 of air valve 94 and is also connected through a flow rate control valve 98 to a second input port 100 of air valve 94. Air under pressure is supplied to air valve 94 and to line 62 from main air reservoir 66 by means of an air line 102, a pressure regulating valve 104, and a secondary air reservoir 106. Secondary air reservoir 106 allows a large volume of air to be ejected at a rapid rate into line 92 through valve 94 whereby pneumatic jack 52 may be forced to lower the pantograph 16 at a rapid rate. In a preferred embodiment a pressure switch 108 is connected to be energized by air pressure in line 92 whereby a signal can be produced to indicate that the emergency system has been actuated. This signal is sent to other vehicles in the train whereby all the pantographs may be lowered or retracted to a rest position at any time that any one pantograph incurs an emergency lowering action.

In the operation of the above-described emergency system, the vent valves 60 are initially in the closed position, i.e., the lever arms 64 are raised whereby the end of the air line 62 is terminated by the vent valve 60. Air from the main air reservoir 66 flows in to the line 102 and through the regulator 104 which regulates the air pressure in the emergency line to, for example, 130 psi. A quantity of air at 130 psi is stored in auxiliary reservoir 106. Air also flows from reservoir 106 into the actuation chamber of relay air valve 94 through inlet port 100. Because of rate control valve 98 the air valve 94 will initially be energized by the pressure in the back portion of the air valve and will allow air to flow through the control ports and into the line 92. However, it will be appreciated that upon initial energization of the system the pantograph 16 will be in a lowered position and that no effects of the air in line 92 will be noted. The air will also flow through the rate control valve 98 and into the forward portion of the relay air valve 94 thereby equalizing the pressure on both sides on a diagragm 110 whereby the valve 94 will be placed in the normally closed position. At this time the emergency system is stabilized and has no effect on the normal operating systems. When the pantograph has been placed in the raised position and a condition occurs whereby lever arm 64 is tripped, such as by the contact wire running down the horn and engaging the lever arm 64, the trip valve 60 will vent to atmosphere relieving the pressure in air line 62 and bleeding the air through port 96 from the front side of the diaphragm 110. Due to the action of the flow rate control valve 98 restricting any additional air flow into air line 62, a differential pressure will be established across the diaphragm 110 allowing the air pressure from reservoir 106 to force air valve 94 into an open position whereby the air from reservoir 106 is conducted through air line 92, check valve 88 and into pneumatic jack 52. This action will force the jack 52 to cause the pantograph arm 44 to be rotated counterclockwise about axis 40 and force a rapid lowering of pantograph 16. At the same time the pressure switch 108 will respond to air pressure in line 92 and send a signal to the pantograph control systems on other vehicles of the train thereby causing all pantographs to be lowered to a rest position.

Figure 5:
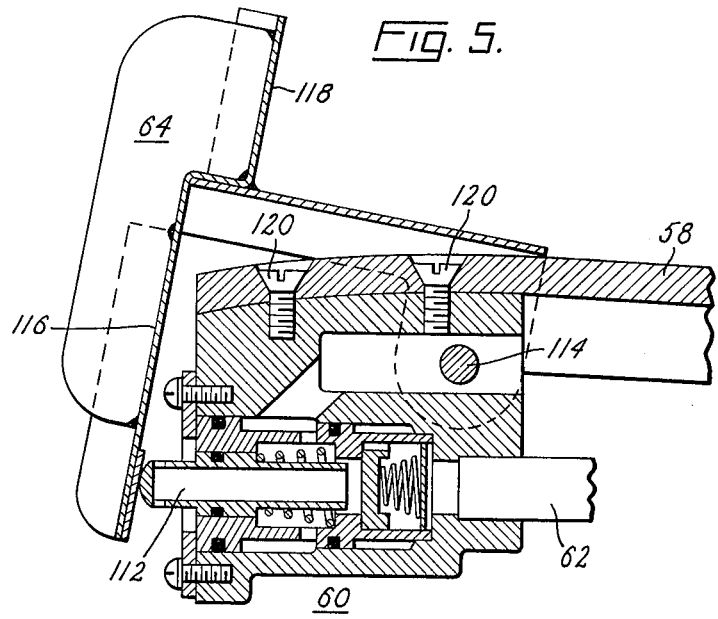
FIG. 5 is a detailed sectional view of the emergency actuating valve of FIG. 3.

Referring now to FIG. 5 there is shown a detailed cross sectional view of the trip valve 60 utilized in the practice of the present invention. The trip valve illustrated is a modified version of a pilot air valve of a type well known in the art such as, for example, a type 2-BA-1 air valve manufactured by WABCO, Wilmerding, Pa. The air valve 60 has been modified by removing a cover plate (not shown) and a push button (not shown) which allowed manual actuation of a plunger 112. The modified version includes the lever arm 64 which is pivotally attached at point 114 to the valve 60. The lever arm 64 is a L-shaped arm which has an extended portion 116 arranged to depress the plunger 112 when the actuating pedal 118 engages an object with sufficient force to depress the arm 64. The valve 60 may be attached to the end of the pantograph horn 58 by means well known in the art such as by screws 120 as is illustrated in FIG. 5.

The inventive system hereinbefore described provides emergency protection for a pantograph through apparatus which is actuated prior to the pantograph becoming fully extended as a result of a contact wire sliding off an end of the current collector. Although the principles of the invention have now been made clear in an illustrated embodiment, there will be immediately obvious to those skilled in the art many modifications, constructions and arrangements used in the practice of the invention which are particularly adapted for specific environments and operation requirements without departing from these principles. The appended claims are therefore intended to cover and embrace any such modifications, subject only to the true spirit and scope of the claims.

What I claim as new and desire to secure by Letters Patent of the United States is:

1. For use on a traction vehicle having electric propulsion equipment that is powered from a wayside source comprising an elevated electric power contact wire, a pantograph comprising:
   a. support means adapted to be mounted on top of the vehicle and movable between extended and retracted positions;
   b. a current collector connected to said support means and having an elongated upper contact surface disposed generally transverse to the direction of movement of the vehicle;
   c. biasing means on said support means for varying said support means toward its extended position, whereby said collector is raised and said upper contact surface is urged into sliding engagement with the overhead contact wire;
   d. counter-biasing means on said support means effective when actuated to move said support means to its retracted position in which said collector is lowered and said upper contact surface is disengaged from the overhead contact wire; and
   e. a pair of automatic actuating means respectively disposed at opposite ends of said upper contact surface, each of said automatic actuating means being responsive to engagement by the overhead contact wire for actuating said counter-biasing means.

2. The pantograph of claim 1 and including additional actuating means for actuating said counter-biasing means in response to a control signal.

3. The pantograph of claim 2 wherein said counter-biasing means is arranged to move said supporting means at a relatively fast rate when actuated by one of said automatic actuating means and at a slower rate when actuated by said additional actuating means.

4. The pantograph of claim 3 wherein said counter-biasing means comprises:
   a. a pneumatic jack;
   b. a pressurized gas source;
   c. control valve means connected between said pressurized gas source and said pneumatic jack; and
   d. means connecting said automatic actuating means to said control valve means whereby actuation of said actuating means is effective to open said control valve and allow pressurized gas to enter said pneumatic jack.

5. The pantograph of claim 4 wherein said additional actuating means comprises second valve means connected between said gas source and said pneumatic jack, said second valve means being responsive to said central signal for causing said source to vent into said jack at a controlled rate whereby said pantograph is retracted at a controlled rate.

6. The pantograph of claim 5 wherein said automatic actuating means comprises a normally closed pneumatic valve having a lever arm extending upward of the upper surface of said current collector for engaging said contact wire and a plunger member arranged to be tripped by movement of said lever arm to thereby open said pneumatic valve.

7. The pantograph of claim 6 wherein said current collector includes depending arcuate members disposed on opposite ends of said contact surface and said automatic actuating means are attached to respective ends of said arcuate members.

8. The pantograph of claim 7 and including a pressure responsive switch connected between said control valve means and said pneumatic jack, said pressure responsive switch being connected to provide an indication of operation of said control valve means.

* * * * *

UNITED STATES PATENT OFFICE
CERTIFICATE OF CORRECTION

PATENT NO. : 4,034,832
DATED : July 12, 1977
INVENTOR(S) : Carl B. Lewis

It is certified that error appears in the above–identified patent and that said Letters Patent are hereby corrected as shown below:

Column 8, line 40, "central" should be corrected to

-- control --

Signed and Sealed this

Twenty-fifth Day of October 1977

[SEAL]

Attest:

RUTH C. MASON
Attesting Officer

LUTRELLE F. PARKER
Acting Commissioner of Patents and Trademarks